United States Patent
Shi et al.

(10) Patent No.: US 10,824,628 B2
(45) Date of Patent: Nov. 3, 2020

(54) METHOD, TERMINAL DEVICE AND STORAGE MEDIUM FOR MINING ENTITY DESCRIPTION TAG

(71) Applicant: BEIJING BAIDU NETCOM SCIENCE AND TECHNOLOGY CO., LTD., Beijing (CN)

(72) Inventors: Yabing Shi, Beijing (CN); Chenglong Xue, Beijing (CN); Shuangjie Li, Beijing (CN); Haijin Liang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 134 days.

(21) Appl. No.: 16/164,619

(22) Filed: Oct. 18, 2018

(65) Prior Publication Data
US 2019/0197166 A1 Jun. 27, 2019

(30) Foreign Application Priority Data
Dec. 27, 2017 (CN) .......................... 2017 1 1447831

(51) Int. Cl.
*G06F 17/00* (2019.01)
*G06F 16/2458* (2019.01)
(Continued)

(52) U.S. Cl.
CPC ........ *G06F 16/2465* (2019.01); *G06F 16/288* (2019.01); *G06F 16/313* (2019.01); *G06F 16/955* (2019.01)

(58) Field of Classification Search
CPC .. G06F 16/2465; G06F 16/313; G06F 16/955; G06F 16/288; G06F 40/211
See application file for complete search history.

(56) References Cited

U.S. PATENT DOCUMENTS

2007/0022109 A1* 1/2007 Imielinski ........... G06F 16/3329
2012/0059849 A1* 3/2012 Yehaskel ................. G06F 16/38
707/772
(Continued)

OTHER PUBLICATIONS

Mihai Surdeanu, Massimiliano Ciaramita, Hugo Zaragoza, "Learning to Rank Answers to Non-Factoid Questions from Web Collections". Computational Linguistics, vol. 37 (2011), pp. 351-383 (Year: 2011).*

*Primary Examiner* — Syed H Hasan
(74) *Attorney, Agent, or Firm* — Lathrop GPM LLP (57) ABSTRACT

The present disclosure provides a method, a terminal device and a storage medium for mining an entity description tag. The method includes: acquiring a group of one or more core words corresponding to each field and a first syntax dependent template corresponding to each core word; performing a matching on each data in a first data source by using the first syntax dependent template to determine a first description tag set in each field; performing a recognition on each data in a second data source to determine an entity set; determining a second description tag set based on a matching degree between each description tag in the description tag set of each field and each data in the second data source; and determining an entity description tag set based on a correlation between each entity in the entity set and each description tag in the second descriptive tag set.

15 Claims, 5 Drawing Sheets

(51) Int. Cl.
*G06F 16/28* (2019.01)
*G06F 16/955* (2019.01)
*G06F 16/31* (2019.01)

(56) References Cited

U.S. PATENT DOCUMENTS

| | | | |
|---|---|---|---|
| 2013/0226846 A1* | 8/2013 | Li | G06N 5/02 706/12 |
| 2014/0074845 A1* | 3/2014 | Dimassimo | G06F 16/316 707/739 |
| 2014/0244550 A1* | 8/2014 | Jin | G06F 16/3347 706/12 |
| 2018/0075366 A1* | 3/2018 | Dole | G06F 16/3329 |
| 2020/0004813 A1* | 1/2020 | Galitsky | G06F 16/9538 |

* cited by examiner

METHOD, TERMINAL DEVICE AND STORAGE MEDIUM FOR MINING ENTITY DESCRIPTION TAG

CROSS-REFERENCE TO RELATED APPLICATION

This application is based upon and claims a priority to Chinese Patent Application No. 201711447831.3, filed on Dec. 27, 2017, the entire content of which is incorporated herein by reference for all purpose.

FIELD

The present disclosure relates to the field of computer technologies, and more particularly to, a method, a terminal device, and a storage medium for mining an entity description tag.

BACKGROUND

An entity description tag refers to a semantically explicit phrase sequence depicting an entity feature. Mining the entity description tag aims to mine entity description tag data with high confidence from a plurality of Internet texts by an information extraction technology.

A method for mining the entity description tag in the related art mostly extract a type of webpage instructed data by an instructed extraction way, to generate a description tag of the field to which an instructed webpage belongs. This way is only applicable to a special field, and has a single tag dimension.

SUMMARY

A first aspect of embodiments of the present disclosure provides a method for mining an entity description tag. The method includes: acquiring a group of one or more core words corresponding to each field and a first syntax dependent template corresponding to each core word; performing a matching on each data in a first data source by using the first syntax dependent template corresponding to each core word to determine a first description tag set in each field; performing a recognition on each data in a second data source to determine an entity set in the second data source, in which, a data amount of the second data source is greater than a data amount of the first data source; determining a second description tag set in the second data source based on a matching degree between each description tag in the first description tag set and each data in the second data source; and determining an entity description tag set based on a correlation between each entity in the entity set and each description tag in the second descriptive tag set.

A second aspect of embodiments of the present disclosure provides a terminal device. The terminal device includes: a memory, a processor and computer programs stored on the memory and executable by the processor. The processor is configured to execute the computer programs to implement the method for mining the entity description tag according to the first aspect.

A third aspect of embodiments of the present disclosure provides a computer readable storage medium, which has computer programs stored thereon. When the computer programs are executed by a processor, the processor is caused to perform the method for mining the entity description tag according to the first aspect.

BRIEF DESCRIPTION OF THE DRAWINGS

The above and/or additional aspects and advantages of the present disclosure will become apparent and more readily appreciated from the following descriptions made with reference to the drawings, in which.

DETAILED DESCRIPTION

Embodiments of the present disclosure will be described in detail in the following and examples of the embodiments are illustrated in the drawings. The same or similar elements and the elements having same or similar functions are denoted by like reference numerals throughout the descriptions. Embodiments described herein with reference to the drawings are explanatory, explain the present disclosure, and are not construed to limit the present disclosure.

In detail, respective embodiments of the present disclosure aim to solve the problems exist in a method for mining an entity description tag in the related art, i.e., the method in the related art mostly extract a type of webpage instructed data by an instructed extraction way, to generate a description tag of the field to which an instructed webpage belongs, and thus this way is only applicable to a special field and has a single tag dimension. Therefore, the embodiments of the present disclosure provide a method for mining an entity description tag to mine the entity description tag of each field from a plurality of dimensions.

Figure 1:
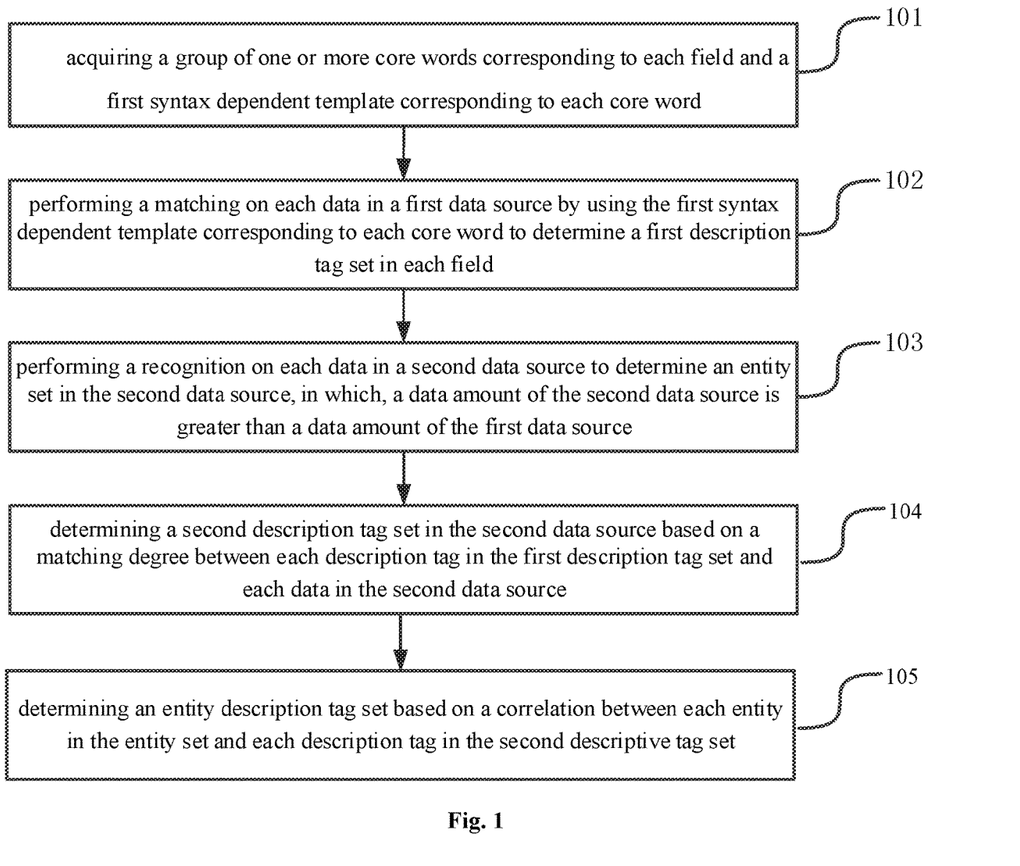
FIG. 1 is a flow chart illustrating a method for mining an entity description tag according to an embodiment of the present disclosure.

FIG. 1 is a flow chart illustrating a method for mining an entity description tag according to an embodiment of the present disclosure.

As illustrated in FIG. 1, the method for mining the entity description tag includes actions in the following blocks.

In block 101, a group of one or more core words corresponding to each field and a first syntax dependent template corresponding to each core word are acquired.

An execution subject of the method for mining the entity description tag provided in embodiments of the present disclosure is a device for mining the entity description tag provided in embodiments of the present disclosure. The device may be provided in any terminal device, to mine the entity description tag.

A core word group corresponding to each field includes one or more core words corresponding to each field. For example, the group corresponding to a film field may include the core words such as "Mojin—The Lost Legend", "horror", "love"; the group corresponding to a tourism field may include the core words such as "tourist spot", "admission ticket", "ride ticket", "hotel".

The first syntax dependent template, may disclose a syntax structure of elements in a language unit by analyzing an independent relationship among the elements in the language unit. The first syntax dependent template may be one or more of the following templates: an SBV (subject-verb) template, a VOB (verb-object) template, an ATT (attribute) template, a DE ("的 (a Chinese character)") template, a COO (coordinate) template and the like.

In detail, a data source of each field may be processed statistically by any way such as a computer device or manual work, to determine the group of the one or more core words corresponding to each field and the first syntax dependent template corresponding to each core word.

In block 102, a matching is performed on each data in a first data source by using the first syntax dependent template corresponding to each core word to determine a first description tag set in each field.

The first data source includes data of each field. In detail, the first data source may include search logs of users and web page tiles. For example, "what tourist spots are suitable for couples to visit in Beijing", "what skiing parks are suitable for novices to ski in Beijing", "what novels are related to robbing a grave".

Figure 1A:
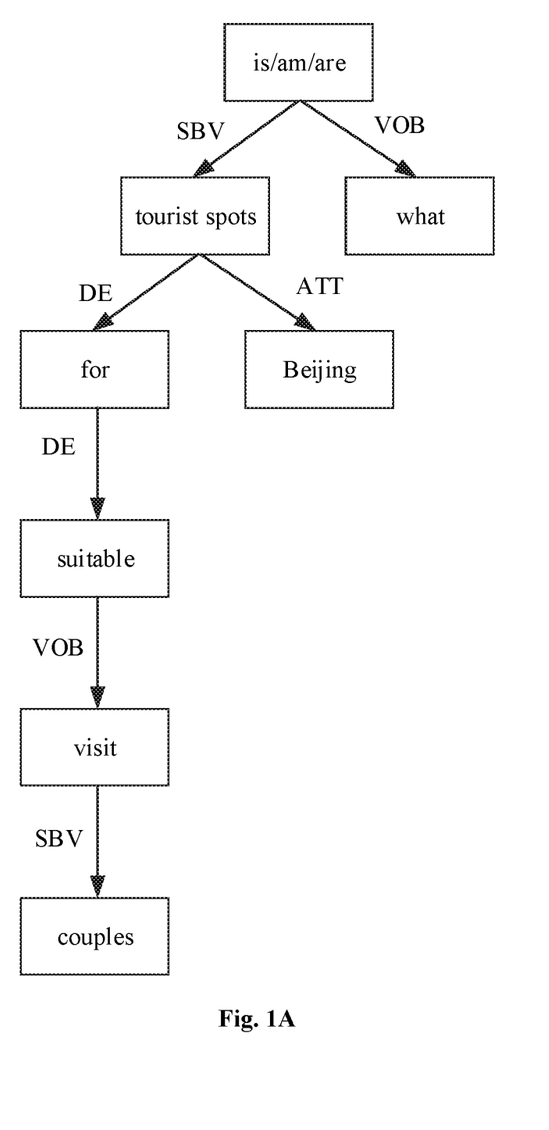
FIG. 1A is a schematic diagram illustrating determining a first description tag set in each field according to an embodiment of the present disclosure.

For example, it is assumed to employ the core word "tourist spot" of the tourism field and the first syntax dependent template of the core word "tourist spot" to perform a matching on "what tourist spots are suitable for couples to visit in Beijing" in the first data source. As illustrated in FIG. 1A, a description tag "suitable for couples to visit" of the tourism field may be determined. Similarly, a matching is performed on "what films are suitable for children recently" in the first data source by using the core word "film" of the film field and the first syntax dependent template of the core word "film", to determine a description tag "suitable for children" of the film field.

In block 103, a recognition is performed on each data in a second data source to determine an entity set in the second data source. A data amount of the second data source is greater than a data amount of the first data source.

The second data source may include a web page database.

In detail, the entity set in the second data source may be determined by an entity chain technology (its main features are entity hot-spot features, prior probability features of an entity type, etc.).

In a possible implementation, before performing the recognition on each data in the second data source, a preprocessing is performed on each data in the second data source, to generate data to be recognized, such that the recognition is performed on the data to be recognized to determine the entity set in the second data source. That is, before the action in block 103, the method further include the following action.

Text segmentation and noise filtering (or text filtering) are performed on each data in the second data source to generate the data to be recognized.

It should be understood that, each data in the second data source is data of page level. In embodiments of the present disclosure, a web page of HTML (Hyper Text Markup Language) format may be analyzed to a sentence set, to divide each data of page level into data of sentence level, and an annotation node, a form node, a script node and a node in frame may be filtered from the data of sentence level simultaneously, to generate the data to be recognized.

In detail, the text segmentation is mainly based on DOM (Document Object Model) node information and a punctuation in the text. The dom node represents that a correlation between content before the node and content after the node is weak, for example, the dom node may be configured to divide elements such as div, br, p. The punctuation mainly refers to a punctuation indicating an end of the sentence, such as a period, a question mark, an exclamation point.

The text filtering mainly filters in an order of a site level (based on a site value), an URL (Uniform Resource Locator) level (based on a page classification and the like), and a text level (based on a keyword, a text length, a text quality and the like).

It should be noted that, in the web page database, a web page which has an incomplete single sentence may exist, for example, in Question and Answer websites, the entity often appears in a question, and the description tag often appears in an answer. Therefore, in embodiments of the present disclosure, a splicing may further be performed on the title and body of the web page, to improve a recall rate when determining the entity set in the second data source.

In block 104, a second description tag set in the second data source is determined based on a matching degree between each description tag in the first description tag set and each data in the second data source.

In detail, a matching threshold may be preset. When a matching degree of a certain phrase sequence in the second data source and any description tag in the first description tag set of each field (the first description tag set is determined in block 102) is greater than the preset threshold, the phrase sequence in the second data source is determined as a description tag in the second description tag set.

In detailed implementation, each data in the second data source may be matched with each description tag in the first description tag set of each field based on a plurality of following methods, to determine the second description tag set in the second data source.

Method One: A Tag Full-Matching Method

In detail, a full matching may be directly performed on each description tag in the first description tag set of each data with each data in the second data source. That is, when a matching degree between a certain phrase sequence in the second data source and any description tag in the first description tag set is 100%, the phrase sequence in the second data source may be determined as a description tag in the second description tag set.

Method Two: An Important Word or Phrase Matching Method

In detail, unimportant words or phrases such as function words may be ignored, and important words of each description tag in the first description tag set may be only matched with each data of the second data source. That is, it is unnecessarily that the matching degree between a certain phrase sequence in the second data source and any description tag in the first description tag set is 100%. The matching degree only needs to be greater than the preset matching threshold, and the phrase sequence in the second data source may be determined as a description tag in the second description tag set.

For example, the first description tag set includes a description tag "suitable for couples to visit", but a matching degree between "suitable for couples", or "suitable for couples to play" in the second data source and "suitable for couples to visit" in the first description tag set is greater than the preset threshold, and then "suitable for couples", and "suitable for couples to visit" may be determined as the description tags in the second description tag set.

In block 105, an entity description tag set is determined based on a correlation between each entity in the entity set and each description tag in the second description tag set.

In detail, the action in block 105 may include sub actions in the following blocks.

In block 105*a*, the second description tag set is updated based on a correlation between each second description tag and each entity.

The second description tag is in the second description tag set. The entity is in the entity set determined in block 103.

In detail, a correlation threshold may be preset, and then the correlation between each second description tag and each entity in a singular sentence is determined by adopting a feature extraction and a model forecast method. The second description tag having a correlation with any entity is lower than the preset correlation threshold is removed from the second description tag set, to update the second description tag set.

Features used in embodiments of the present disclosure may be classified into tag related features, lexical and syntactic features, negative word related features, and multi-sentence input related features. In addition, to ensure versatility of models, all selected features are semantically independent.

Since some features selected by embodiments of the present disclosure are relatively basic features, such as independent relationship, a model selected is a more complex random forest model, which is convenient for further abstracting the basic features.

In detail, the method of determining whether each entity in the entity set is correlated with each second description tag by adopting the feature extraction and the model forecast method, has advantages of high generalization and high accuracy when processing loud noise or complicated text.

Further, after determining an updated second description tag set according to the correlation between each second description tag and each entity in the singular sentence, a big data overall check may be performed on the foregoing updated second description tag set by using some external data, to correct the updated second description tag set, which improves confidence of the updated second description tag set.

In detail, the big data overall check is performed, to improve the confidence of the updated second description tag set by checking based on a statistical result (such as a positive ratio determining, a chi-square check), checking based on knowledge base information (for example, for important attributes of a certain category, such as an author of a novel category), checking based on syntax (such as in all description tags related to the same entity, whether an antonym or a mutex tag included is determined), checking based on user data and the other strategies.

In block 105*b*, the updated second description tag set is normalized to determine the entity description tag set.

In detail, after normalizing the updated second description tag set, the entity description tag set may be acquired. The detailed method for normalizing the updated second description tag set is same with the method for normalizing the first description tag set of each field in block 102, which will not be elaborated herein.

It should be noted that, the second description tag set includes description tags of all fields. Thus, the entity description tag set includes entity description tags of all fields.

The second description tag set is updated according to a correlation between each entity and each second description tag in a singular sentence granularity, and the statistic check is performed on the updated second description tag set based on the plurality of data, to determine the entity description tag set, which improves the accuracy of mining the entity description tag.

In addition, the action in block 103 may be simultaneously performed with the action in block 101, and further may be performed with the action in block 102, and only needs to be performed before the action in block 105.

With the method for mining the entity description tag in embodiments of the present disclosure, after acquiring the group of the one or more core words corresponding to each field and the first syntax dependent template corresponding to each core word, firstly the matching is performed on each data in the first data source by using the first syntax dependent template corresponding to each core word to determine the first description tag set in each field, and secondly the recognition is performed on each data in the second data source to determine the entity set in the second data source, and then the second description tag set in the second data source is determined based on the matching degree between each description tag in the first description tag set and each data in the second data source, and finally the entity description tag set is determined based on the correlation between each entity in the entity set and each description tag in the second descriptive tag set. Thus, mining the entity description tag of each field from the plurality of dimensions is implemented, and the coverage of fields for mining the entity description tag and the accuracy of the mining result are improved.

Figure 2:
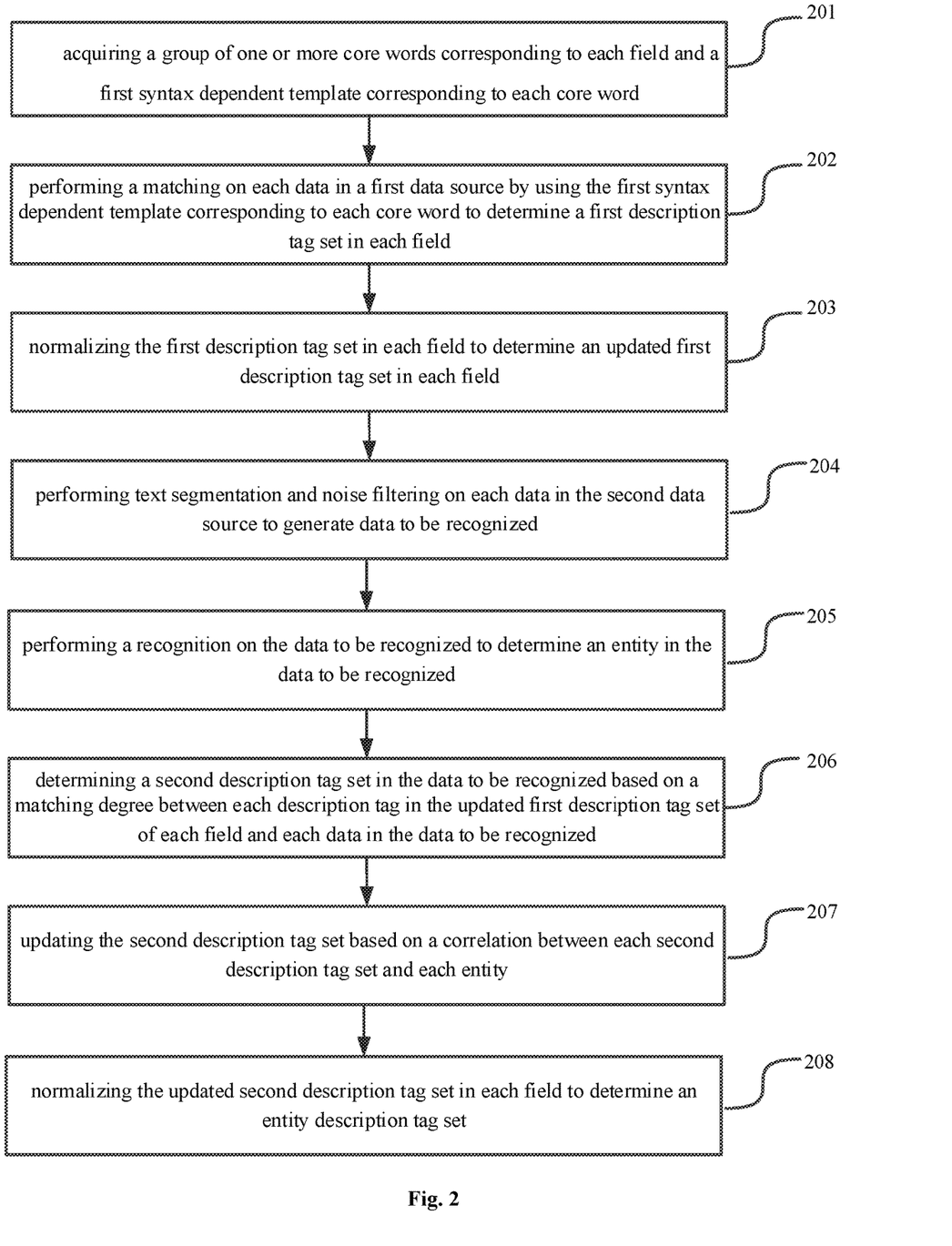
FIG. 2 is a flow chart illustrating a method for mining an entity description tag according to another embodiment of the present disclosure.

According to the above analysis, it may be known that, after acquiring the group of the one or more core words corresponding to each field and the first syntax dependent template corresponding to each core word, the matching may be performed on each data in the first data source by using the first syntax dependent template corresponding to each core word to determine the first description tag set in each field, and thus after performing the recognition on each data in the second data source to determine the entity set in the second data source, the second description tag set in the second data source is determined based on the matching degree between each description tag in the first description tag set and each data in the second data source, and then the entity description tag is determined based on the correlation between each entity in the entity set and each description tag in the second description tag set. In practical application, the matching is performed on each data in the first data source by using the first syntax independent template corresponding to each core word to determine the first description tag set of each field. The determined first description tag set of each field may include one or more synonymous or lower quality description tags. As illustrated in FIG. 2 below, detailed illustration will be made for the foregoing situation.

FIG. 2 is a flow chart illustrating a method for mining an entity description tag according to another embodiment of the present disclosure.

As illustrated in FIG. 2, the method includes actions in the following blocks.

In block 201, a group of one or more core words corresponding to each field and a first syntax dependent template corresponding to each core word are acquired.

In block 202, a matching is performed on each data in a first data source by using the first syntax dependent template corresponding to each core word to determine a first description tag set in each field.

Detailed implementation procedures and principles of the actions in the foregoing blocks 201-202 may refer to detailed description of the foregoing embodiments, which will not be elaborated herein.

In block 203, the first description tag set in each field is normalized to determine an updated first description tag set of each field.

It should be understood that, the first description tag set of each field determined through the matching on each data in the first data source by using the first syntax independent template corresponding to each core word, may include the one or more synonymous description tags, such as "suitable for children" and "suitable for kids". Therefore, in embodiments of the present disclosure, the first description tag set of each field may be normalized, to remove a repeating tag from the first description tag set.

In detail, each description tag in the first description tag set may be vectored by using the text depth representation model Word2Vec that characterizes a word as a real-value vector, and then a DBSCAN (Density-Based Spatial Clustering of Applications with Noise) is adopted to cluster. The semantic similarity of each two description tags is calculated to normalize in the cluster, to update the first description tag set and determine the updated first description tag set of each field.

In addition, a quality of the determined first description tag set of each field may be lower, for example there is semantic uncertainty caused by truncation, etc. Therefore, in embodiments of the present disclosure, each description tag in the determined first description tag set may be filtered, to improve the quality of the first description tag set.

In detail, each description tag in the first description tag set may be filtered by using training random forest unified models such as a pornographic inverse feature, a syntactic template bi-gram feature, an entity word feature, a time-sensitive feature, a statistical frequency feature, to acquire the first description tag set with a high quality.

In a possible implementation, a coverage rate of the first syntax independent template corresponding to each core word, determined by the action in block 201, may be lower, and thus the matching is performed on each data in the first data source by using the first syntax independent template, and a coverage of the determined first description tag set of each field may be lower accordingly. In embodiments of the present disclosure, the acquired first syntax independent template corresponding to each core word may be extended, and the matching is performed on each data in the first data source by using the syntax independent template extended, to enable the description tag in the first description tag set determined richer. That is, after the action in block 202, the method further including the following.

A screening is performed on the first data source by using the first description tag set, to acquire a text set including each description tag in the first description tag set.

A syntactic analysis is performed on each text in the text set to determine a second syntax dependent template corresponding to each description tag in each text.

When a type of the second syntax dependent template corresponding to any description tag is different from a type of the corresponding first syntax dependent template, the matching is performed on each data in the first data source by using the second syntax dependent template.

In detail, the text set including each description tag in the first description tag set may be screened out from the first data source by using the first description tag set. Or, to improve the coverage of the screened text set, a threshold may be preset, and then the text set including a certain phrase sequence is screened out, in which, a matching degree between the phrase sequence and any description tag in the first description tag set is greater than the preset threshold. The second syntax independent template corresponding to each description tag is determined by performing a syntactic analysis on each text in the text set. When a type of the second syntax dependent template corresponding to any description tag is different from a type of the first syntax dependent template used for determining this description tag, the matching is performed on each data in the first data source by using the second syntax dependent template, and the description tag set of each field, which is determined in this action, is added to the first description tag set determined in block 202, to implement expansion of the first description tag set. Therefore, the matching is performed on each data in the first data source by using the second syntax independent template expanded, to enable the coverage of the first description tag set higher.

In block 204, text segmentation and noise filtering are performed on each data in the second data source to generate data to be recognized.

In block 205, a recognition is performed on the data to be recognized to determine an entity set in the data to be recognized.

A data amount of the second data source is greater than a data amount of the first data source.

In block 206, a second description tag set in the data to be recognized is determined based on a matching degree between each description tag in the updated first description tag set of each field and the data to be recognized.

In block 207, the second description tag set is updated based on a correlation between each description tag and each entity.

In block 208, the updated second description tag set is normalized to determine the entity description tag set.

Detailed implementation procedures and principles of the foregoing blocks 204-205 may refer to detailed description of the foregoing embodiments, which will not be elaborated herein.

It should be noted that, the action in block 204 may be simultaneously performed with the action in block 205, and further may be performed with the action in block 202, and only needs to be performed before the action in block 207.

Figure 2A:
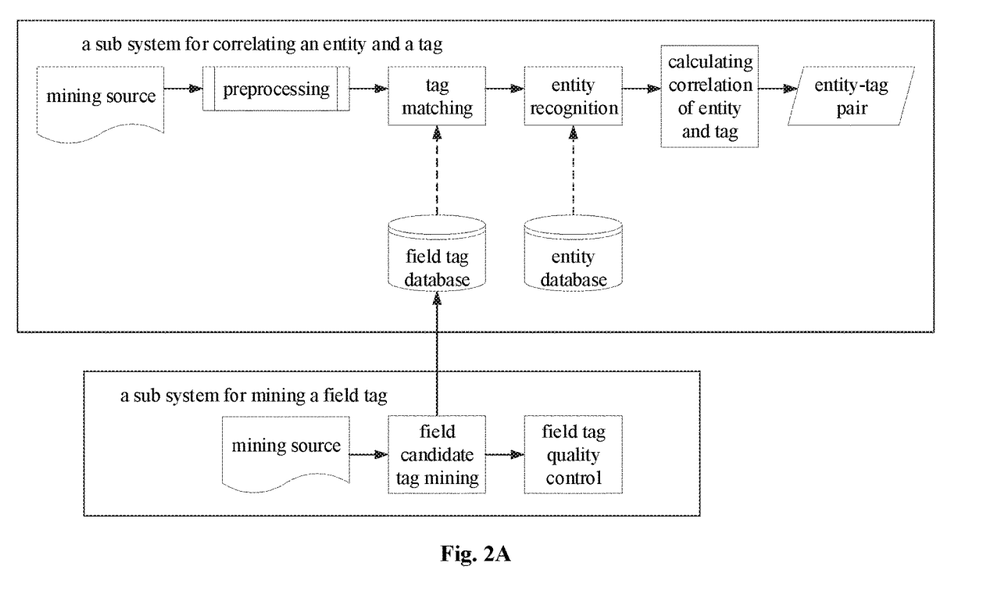
FIG. 2A is a block diagram illustrating a system for mining an entity description tag according to an embodiment of the present disclosure.

Description will be made below to a method for mining an entity description tag provided in embodiments of the present disclosure with reference to a block diagram of a system for mining an entity description tag as illustrated in FIG. 2A.

As illustrated in FIG. 2A, the system for mining the entity description tag includes a sub system for mining a field tag and a sub system for correlating an entity and a tag. A mining source of the sub system for mining the field tag includes search logs of users and web page titles, and a mining source of the sub system for correlating the entity and the tag includes a web page database.

A field tag database may be mined by performing a field candidate tag mining and a field tag quality control on the search logs of users and the web page titles, that is, a first description tag set of each field in embodiments of the present disclosure may be acquired. After performing text segmentation, noise filtering and the other preprocessing on the web page database, the pre-processed data is matched with the field tag mined by the sub system for mining the field tag, to determine a second description tag set. By performing calculating a correlation between each entity recognized in an entity recognition processing and each description tag in the second description tag set, i.e., based on the correlation, an entity-tag pair is determined, that is the entity description tag in embodiments of the present disclosure is determined.

With the method for mining the entity description tag in embodiments of the present disclosure, after acquiring the group of the one or more core words corresponding to each field and the first syntax dependent template corresponding to each core word, firstly the matching is performed on each data in the first data source by using the first syntax dependent template corresponding to each core word to determine the first description tag set in each field, and secondly the first description tag set in each field is normalized to determine the updated first description tag set in each field, and secondly text segmentation and noise filtering are performed on each data in the second data source to generate the data to be recognized, and thirdly the recognition is performed on the data to be recognized to determine the entity in the data to be recognized, and then the second description tag set is updated based on the correlation between each second description tag and each entity, and finally the updated second description tag set is normalized to determine the entity description tag set. Thus, mining the entity description tag of each field from the plurality of dimensions is implemented, and the coverage of fields for mining the entity description tag and the accuracy of the mining result are improved.

Figure 3:
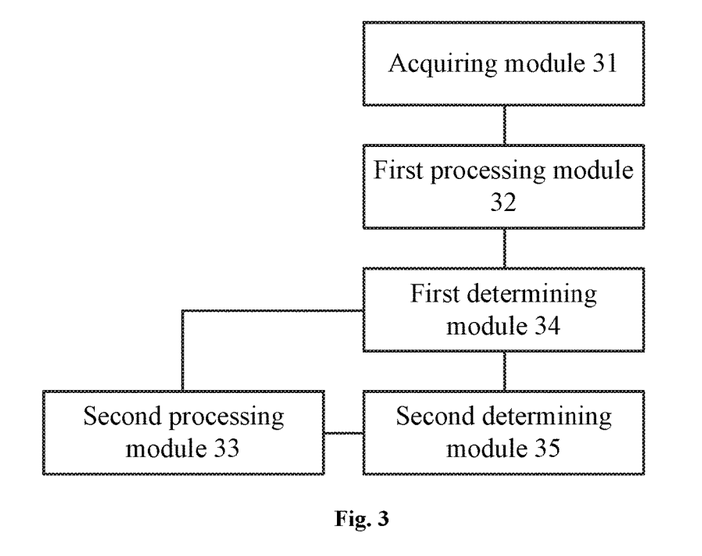
FIG. 3 is a block diagram illustrating a device for mining an entity description tag according to an embodiment of the present disclosure.

FIG. 3 is a block diagram illustrating a device for mining an entity description tag according to an embodiment of the present disclosure.

As illustrated in FIG. 3, the device for mining the entity description tag includes: an acquiring module 31, a first processing module 32, a second processing module 33, a first determining module 34, and a second determining module 35.

The acquiring module 31 is configured to acquire a group of one or more core words corresponding to each field and a first syntax dependent template corresponding to each core word.

The first processing module 32 is configured to perform a matching on each data in a first data source by using the first syntax dependent template corresponding to each core word to determine a first description tag set in each field.

The second processing module 33 is configured to perform a recognition on each data in a second data source to determine an entity set in the second data source, in which a data amount of the second data source is greater than a data amount of the first data source.

The first determining module 34 is configured to determine a second description tag set in the second data source based on a matching degree of each description tag in the first description tag set and each data in the second data source.

The second determining module 35 is configured to determine an entity description tag set based on a correlation between each entity in the entity set and each description tag in the second descriptive tag set.

In detail, the device for mining the entity description tag provided in embodiments of the present disclosure, may execute the method for mining the entity description tag. The device is configured in any terminal device, to perform mining of the entity description tag.

The foregoing data source includes search logs of users and web page titles; the second data source includes a web page database.

In a possible implementation of embodiments of the present disclosure, the foregoing second determining module 35 is configured to: update the second description tag set based on the correlation between each second description tag and each entity; and normalize the updated second description tag set to determine the entity description tag set.

It should be noted that, the foregoing explanation for the method for mining the entity description tag further may be applicable to the device for mining the entity description tag of the embodiment, which will not be elaborated herein.

With the device for mining the entity description tag in embodiments of the present disclosure, after acquiring the group of the one or more core words corresponding to each field and the first syntax dependent template corresponding to each core word, firstly the matching is performed on each data in the first data source by using the first syntax dependent template corresponding to each core word to determine the first description tag set in each field, and secondly the recognition is performed on each data in the second data source to determine the entity set in the second data source, and then the second description tag set in the second data source is determined based on the matching degree between each description tag in the first description tag set and each data in the second data source, and finally the entity description tag set is determined based on the correlation between each entity in the entity set and each description tag in the second descriptive tag set. Thus, mining the entity description tag of each field from the plurality of dimensions is implemented, and the coverage of fields for mining the entity description tag and the accuracy of the mining result are improved.

Figure 4:
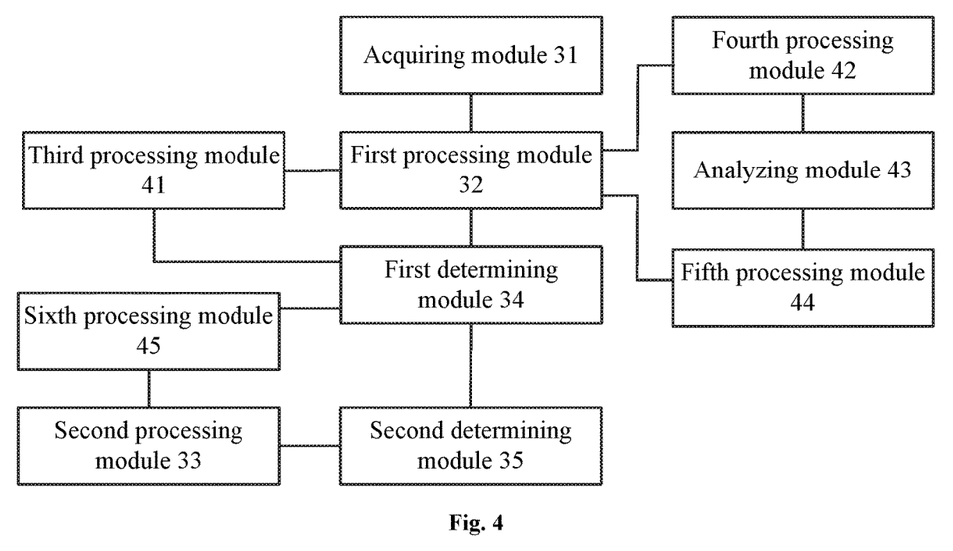
FIG. 4 is a block diagram illustrating a device for mining an entity description tag according to another embodiment of the present disclosure.

FIG. 4 is a block diagram illustrating a device for mining an entity description tag according to another embodiment of the present disclosure.

As illustrated in FIG. 4, based on the FIG. 3, the device for mining the entity description tag, further includes: a third processing module 41, a fourth processing module 42, an analyzing module 43, a fifth processing module 44, and a sixth processing module 45.

The third processing module 41 is configured to normalize the first description tag set in each field to determine an updated first description tag set in each field.

The fourth processing module 42 is configured to perform a screening on the first data source by using the first description tag set to acquire a text set including each description tag in the first description tag set.

The analyzing module 43 is configured to perform a syntactic analysis on each text in the text set to determine a second syntax dependent template corresponding to each description tag in each text.

The fifth processing module 44 is configured to perform the matching on each data in the first data source by using the second syntax dependent template when a type of the second syntax dependent template corresponding to any description tag is different from a type of the corresponding first syntax dependent template.

The sixth processing module 45 is configured to perform text segmentation and noise filtering on each data in the second data source to generate data to be recognized.

It should be noted that, the foregoing explanation for the method for mining the entity description tag further may be applicable to the device for mining the entity description tag of the embodiment, which will not be elaborated herein.

With the device for mining the entity description tag of embodiments of the present disclosure, after acquiring the group of the one or more core words corresponding to each field and the first syntax dependent template corresponding to each core word, firstly the matching is performed on each data in the first data source by using the first syntax dependent template corresponding to each core word to determine the first description tag set in each field, and secondly the first description tag set in each field is normalized to determine the updated first description tag set in each field, and secondly text segmentation and noise filtering are performed on each data in the second data source to generate the data to be recognized, and thirdly the recognition is performed on the data to be recognized to determine the entity in the data to be recognized, and then the second description tag set is updated based on the correlation between each second description tag and each entity, and finally the updated second description tag set is normalized to determine the entity description tag set. Thus, mining the entity description tag of each field from the plurality of dimensions is implemented, and the coverage of fields for mining the entity description tag and the accuracy of the mining result are improved.

A third aspect of embodiments of the present disclosure provides a terminal device. The terminal device includes: a memory, a processor and computer programs stored on the memory and executable by the processor. The processor is configured to execute the computer programs to implement the method for mining the entity description tag according to the foregoing embodiments.

A forth aspect of embodiments of the present disclosure provides a computer-readable storage medium having computer programs stored thereon. When the computer programs are executed by a processor, the processor is caused to perform the method for mining the entity description tag according to the foregoing embodiments.

A fifth aspect of embodiments of the present disclosure provides a computer program product. When instructions in the computer program product is executed by a processor, the method for mining the entity description tag according to the foregoing embodiments is implemented.

Reference throughout this specification to "an embodiment," "some embodiments," "one embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without a contradiction, the different embodiments or examples and the features of the different embodiments or examples can be combined by those skilled in the art.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more, for example, two, three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, apparatus and equipment and executing the instruction), or to be used in combination with the instruction execution system, apparatus and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments are exemplary and cannot be construed to limit the present disclosure, and changes, alternatives, and modifications can be made in the embodiments without departing from scope of the present disclosure.

What is claimed is:

1. A computer-implemented method for mining an entity description tag, comprising:

acquiring, by one or more computing devices, a group of one or more core words corresponding to each field and a first syntax dependent template corresponding to each core word;

performing, by the one or more computing devices, a matching on each data in a first data source by using the first syntax dependent template corresponding to each core word to determine a first description tag set in each field;

performing, by the one or more computing devices, a screening on the first data source by using the first description tag set to acquire a text set comprising each description tag in the first description tag set;

performing, by the one or more computing devices, a syntactic analysis on each text in the text set to determine a second syntax dependent template corresponding to each description tag in each text; and when a type of the second syntax dependent template corresponding to any description tag is different from a type of the corresponding first syntax dependent template, performing, by the one or more computing devices, the matching on each data in the first data source by using the second syntax dependent template;

performing, by the one or more computing devices, a recognition on each data in a second data source to determine an entity set in the second data source, a data amount of the second data source being greater than a data amount of the first data source;

determining, by the one or more computing devices, a second description tag set in the second data source based on a matching degree between each description tag in the first description tag set and each data in the second data source; and determining, by the one or more computing devices, an entity description tag set based on a correlation between each entity in the entity set and each description tag in the second descriptive tag set.

2. The method of claim 1, after determining the first description tag set in each field, further comprising:

normalizing, by the one or more computing devices, the first description tag set in each field to determine an updated first description tag set in each field.

3. The method of claim 1, before performing the recognition on each data in the second data source to determine the entity set in the second data source, further comprising:

performing, by the one or more computing devices, text segmentation and noise filtering on each data in the second data source to generate data to be recognized.

4. The method of claim 1, wherein determining the entity description tag set comprises:

updating, by the one or more computing devices, the second description tag set based on a correlation between each second description tag and each entity; and normalizing, by the one or more computing devices, the updated second description tag set to determine the entity description tag set.

5. The method of claim 1, wherein the first data source comprises search logs of users and web page titles; and the second data source comprises a webpage database.

6. A terminal device, comprising:

a memory, a processor and computer programs stored on the memory and executable by the processor, wherein the processor is configured to execute the computer programs to implement the following actions:

acquiring a group of one or more core words corresponding to each field and a first syntax dependent template corresponding to each core word;

performing a matching on each data in a first data source by using the first syntax dependent template corresponding to each core word to determine a first description tag set in each field;

performing a screening on the first data source by using the first description tag set to acquire a text set comprising each description tag in the first description tag set;

performing a syntactic analysis on each text in the text set to determine a second syntax dependent template corresponding to each description tag in each text; and when a type of the second syntax dependent template corresponding to any description tag is different from a type of the corresponding first syntax dependent template, performing the matching on each data in the first data source by using the second syntax dependent template;

performing a recognition on each data in a second data source to determine an entity set in the second data source, a data amount of the second data source being greater than a data amount of the first data source;

determining a second description tag set in the second data source based on a matching degree between each description tag in the first description tag set and each data in the second data source; and determining an entity description tag set based on a correlation between each entity in the entity set and each description tag in the second descriptive tag set.

7. The terminal device of claim 6, wherein the processor is further configured to implement the following actions:

after determining the first description tag set in each field, normalizing the first description tag set in each field to determine an updated first description tag set in each field.

8. The terminal device of claim 6, wherein the processor is further configured to implement the following actions:

before performing the recognition on each data in the second data source to determine the entity set in the second data source, performing text segmentation and noise filtering on each data in the second data source to generate data to be recognized.

9. The terminal device of claim 6, wherein determining the entity description tag set comprises:

updating the second description tag set based on a correlation between each second description tag and each entity; and normalizing the updated second description tag set to determine the entity description tag set.

10. The terminal device of claim 6, wherein the first data source comprises search logs of users and web page titles; and the second data source comprises a webpage database.

11. A non-transitory computer-readable storage medium having computer programs stored thereon, wherein when the computer programs are executed by a processor, the processor is caused to perform a method, the method including:

acquiring a group of one or more core words corresponding to each field and a first syntax dependent template corresponding to each core word;

performing a matching on each data in a first data source by using the first syntax dependent template corresponding to each core word to determine a first description tag set in each field;

performing a screening on the first data source by using the first description tag set to acquire a text set comprising each description tag in the first description tag set;

performing a syntactic analysis on each text in the text set to determine a second syntax dependent template corresponding to each description tag in each text; and when a type of the second syntax dependent template corresponding to any description tag is different from a type of the corresponding first syntax dependent template, performing the matching on each data in the first data source by using the second syntax dependent template;

performing a recognition on each data in a second data source to determine an entity set in the second data source, a data amount of the second data source being greater than a data amount of the first data source;

determining a second description tag set in the second data source based on a matching degree between each description tag in the first description tag set and each data in the second data source; and determining an entity description tag set based on a correlation between each entity in the entity set and each description tag in the second descriptive tag set.

12. The non-transitory computer-readable storage medium of 11, wherein the method further comprises:

after determining the first description tag set in each field, normalizing the first description tag set in each field to determine an updated first description tag set in each field.

13. The non-transitory computer-readable storage medium of 11, wherein the method further comprises:

before performing the recognition on each data in the second data source to determine the entity set in the second data source, performing text segmentation and noise filtering on each data in the second data source to generate data to be recognized.

14. The non-transitory computer-readable storage medium of 11, wherein determining the entity description tag set comprises:

updating the second description tag set based on a correlation between each second description tag and each entity; and normalizing the updated second description tag set to determine the entity description tag set.

15. The non-transitory computer-readable storage medium of 11, wherein the first data source comprises search logs of users and web page titles; and the second data source comprises a webpage database.

* * * * *